United States Patent [19]

Meisenheimer

[11] 3,809,996

[45] May 7, 1974

[54] LOAD BALANCING VOLTAGE REGULATOR

[76] Inventor: Raymond L. Meisenheimer, 1262 E. Kay Dr., Cherry Hill, N.J.

[22] Filed: Nov. 2, 1972

[21] Appl. No.: 303,103

[52] U.S. Cl. .................. 322/28, 307/57, 322/73
[51] Int. Cl. ............................................. H02p 9/30
[58] Field of Search ............ 307/57, 47, 84; 320/56; 322/28, 73

[56] References Cited
UNITED STATES PATENTS

| | | | |
|---|---|---|---|
| 2,859,358 | 11/1958 | King | 307/57 |
| 3,022,427 | 2/1962 | Jensen | 307/57 |
| 3,465,163 | 9/1969 | White | 307/57 |
| 3,480,790 | 11/1969 | Porter et al. | 307/57 |

Primary Examiner—James D. Trammell
Attorney, Agent, or Firm—Charles F. Duffield

[57] ABSTRACT

A voltage regulator is disclosed which includes circuitry therein which may be interconnected with other regulators for machines operating in parallel to provide interaction between the coupled regulators to increase the output of the lower generating machine to match the higher output machine. The regulator includes a voltage sensing network whose output controls a power transistor in series with the field excitation to inversely regulate the field excitation in accordance with the output voltage of the generator. Each regulator further includes a voltage divider network connected between the field excitations of each regulator which network is responsive to the presence of greater excitation in the other regulators to vary the voltage sensing network in the one regulator to increase field excitation to achieve load balance.

10 Claims, 2 Drawing Figures

PATENTED MAY 7 1974 3,809,996

LOAD BALANCING VOLTAGE REGULATOR

BACKGROUND OF INVENTION

The present invention applies generally to voltage regulators and, more particularly, to regulators which may be used with two or more current generating machines to achieve load balance between the machines.

In many power generating systems such as twin engine airplanes or twin engine boats, it is desirable to employ an alternator or generator machine on each engine which are connected in parallel to supply a common load circuit.

Where separate regulators for each generating machine are employed without any circuitry to achieve load balancing, invariably one generator will carry more than its proportionate share of the load. This occurs because the individual regulator characteristics vary such as the differences in the temperatures of the regulators, differences in slope and curvature of their transfer characteristics, winding resistances and misadjustment of the regulator voltage settings. Accordingly, some form of load balance regulation is required.

The manner in which the two generators are interconnected into the common load source and their outputs regulated becomes extremely important from the standpoint of load balance between the generators when both are operating as well as reliability of the generators in the case one of them happens to fail. There are basically two different designs which have been commonly used for regulating the electrical output of the individual machines in a multiple system.

The first such system is a single voltage regulator which may be used to control the machine fields as if they were one machine. This is accomplished by conductive paralleling of the fields of the machines. This system has an important reliability limitation in that an electrical fault occurring in one machine or in their common field circuit windings may result in disabling all of the power generating capability of both machines, thus negating the reliability advantage that should be inherent in the use of multiple machines.

The second design of regulation balancing system is one in which the individual machines employ individual load current sensing elements at their output terminals. The sensing elements develop information which is employed to automatically control the separate field voltages of their particular regulator-generator combination in a manner to obtain the desired load balancing between the two machines. This system achieves the load balancing characteristic and reliability which is desired but the complexity and cost of existing electronic systems of this type make them impractical for low cost applications.

OBJECT AND SUMMARY OF INVENTION

It is the object of the present invention to provide a voltage regulator which may be interconnected with like regulators on other generating machines to provide load balance between the machines without effect of failure of one of the machines upon the other by sensing and comparing the field voltages and adjusting the lower field voltages to the higher one to achieve load balancing.

The foregoing object is carried out in the present invention by providing one leg of a control voltage divider in each regulator which is connected to the field voltage being applied through that regulator. The legs in each of the control voltage divider in each regulator are connected together at a midpoint to form the control voltage divider. A third leg connected to the first leg at the midpoint in each regulator also provides a voltage divider across the field being applied to each machine in each regulator. The impedance in the first legs of the regulators is relatively small compared to the large impedance in the third legs. Any variation in field exitation in one regulator is thus reflected into the other regulators through the the common voltage divider.

A control comparison transistor is employed and has its current path connected to the midpoint of the control voltage divider. The bias upon the transistor is through a bias voltage divider connected across the field in each regulator and the impedance of the second voltage divider is set such that the transistor is maintained at incipient conduction throughout the entire voltage range of the field in normal operation of a given regulator-generator pair.

Any increase in exitation of one of the generators is reflected as an increased potential at the midpoint in the control voltage divider which, in turn, drives the comparison transistor of the companion regulators into conduction. The output of the comparison transistor is used to alter the regulator voltage of the regulator in a manner to, in turn, increase the field current into the generator to a point to establish balanced field currents and consequent load between the generating machines.

A decrease in field voltage being reflected from one regulator to the other is ineffective in the other regulators inasmuch as the transistor in that regulator is already nonconducting and is driven further from conduction without effect. In this manner, complete failure of one regulator-generator pair is not effective in the regulator presenting the higher field voltage.

Other objects and advantages of the present invention will become apparent to those skilled in the art from the detailed description thereof which follows taken in conjunction with the drawings.

DETAILED DESCRIPTION OF INVENTION

Figure 1:
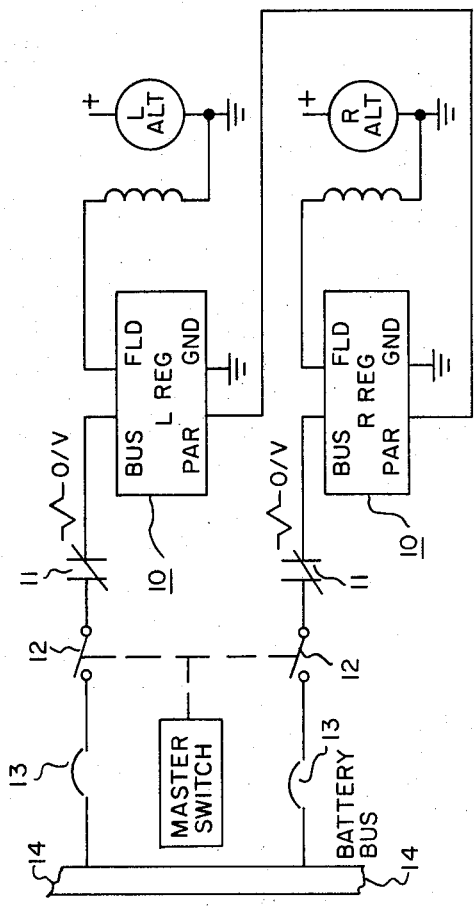
FIG. 1 is a schematic diagram of the two regulators of the present invention in circuit with their respective generating machines which are connected in parallel with a common load showing the interconnection between the regulator terminals.

Referring to FIG. 1, the regulator 10 of the present invention is shown in block diagram in combination with an identical regulator in a dual alternator arrangement such as would commonly be found in a twin engine aircraft. In this arrangement, the bus terminal of each regulator is connected, in series, through an overvoltage relay 11, master switch contacts 12 and circuit breaker 13 to the common bus bar 14 of the airplane. In this manner, the bus terminal of each regulator will have applied to it the common bus bar voltage.

The field terminals of each regulator 10 are connected into the field terminals of their respective left and right alternators as shown in FIG. 1. The alternators, themselves, are appropriately grounded and their output applied through a conductor (not shown) to the battery of the aircraft. Both regulators 10 are appropriately grounded in a like manner as the alternators also shown in FIG. 1.

Each of the regulators 10 includes a parallel terminal which involves circuitry and operates within each regulator as to be hereinafter described. In operation, the parallel terminals of each of the regulators are interconnected by a conductor 15.

Figure 2:
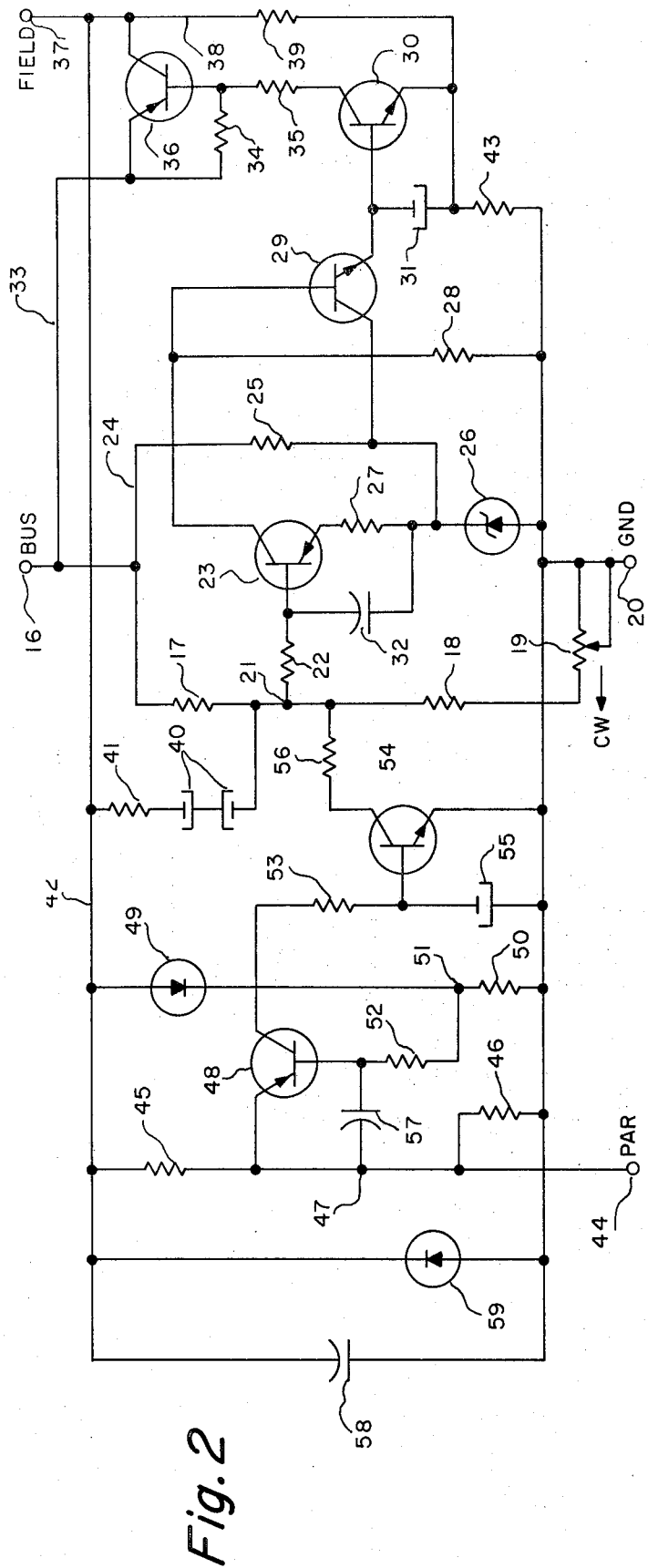
FIG. 2 is a detailed schematic diagram of the voltage regulator of the present invention.

The details of the load balancing voltage regulator of the present invention are shown in FIG. 2 of the drawing. The positive bus bar voltage is applied through the bus terminal 16 across a regulating voltage divider consisting of resistors 17 and 18 and variable resistor 19. The lower end of the voltage divider is tied to ground at the ground terminal 20. The midpoint 21 of the voltage divider will, accordingly, swing with the voltage on the bus bar and provides a control voltage through current limiting resistor 22 to the base of a comparison transistor 23.

The emitter current for transistor 23 is via conductor 24 from the bus terminal through current limiting resistor 25 and current limiting resistor 27. The emitter potential is maintained at a fixed reference level by zener diode 26 which is connected intermediate the current limiting resistor 25 and ground.

The output from the collector of transistor 23 is applied in a parallel circuit to a gain dampening or limiting resistor 28 and the base of a first driver transistor 29. The collector current for transistor 29 is supplied from the same reference voltage source as the emitter current for transistor 23. The emitter current of transistor 29, in turn, is applied as the input to the base of a second driver transistor 30.

A filter capacitor 31 between the base terminal and emitter for transistor 30 serves to filter low frequency components from the base circuit. In a like manner, a filter capacitor 32 is employed around the base to emitter junction of comparison transistor 23.

The emitter of transistor 30 is tied to ground through gain suppression resistor 43 and the collector of that transistor is connected through current limiting resistor 35 to the base of a power transistor 36 to provide the bias for that transistor.

Power transistor 36 is the current regulating element for the field current in the generating machine. Its emitter-collector junction is in series with the bus terminal via conductor 33 and provides the output for the field windings to the field terminal 37 of the regulator. An emitter to base resistor 34 is employed to increase the transistor standoff potential available.

In operation, minor voltage changes sensed on the bus bar are amplified, in inverse ratio, by transistors 23, 29 and 30. The inverse amplified signal appearing at transistor 30 is, in turn, applied to the base of power transistor 36 to vary the field winding output through that transistor in the opposite direction of the voltage changes on the bus bar. Accordingly, a continuous modulated regulation is obtained.

A first negative feedback loop via conductor 38 and including resistor 39 is employed between the collector of power transistor 36 and the emitter of transistor 30. The negative feedback loop serves to stabilize and dampen any rapid changes in the field winding current.

A second negative feedback path to prevent oscilations is provided through bipolar capacitor 40 and current limiting resistor 41 which are connected between the field terminal output via conductor 42 and the midpoint 21 of the regulating voltage divider. In this manner, low frequency oscilations which might otherwise occur are dampened by the negative feedback to the control voltage at the midpoint 21 of the voltage divider.

The circuitry just described operates in any given voltage regulator to control the field current for the particular generating machine with which it is associated. The remainder of the circuitry on the left hand side of FIG. 2 is utilized for accomplishing the balancing circuit operation of two or more generating machines when their respective regulators are connected in parallel across the parallel terminals as discussed in respect to FIG. 1.

When the parallel terminals 44 of each of the regulators of the parallel operating machines are connected together, a control voltage divider is formed between the two regulators. The control voltage divider includes resistor 45 in each regulator which forms a first leg of the control voltage divider which is connected at its midpoint 47 by the parallel line 15 interconnecting the two regulators.

A second voltage divider is formed in each regulator by a resistor 46 connected to ground and the midpoint 47 of the control voltage divider. This second voltage divider includes resistor 46 and common resistor 45 and is across the field exitation of each regulator. Resistor 45 is of very low impedance in the order of 300 ohms while resistor 46 is of relatively high impedance in the order of 80,000 ohms.

Assume first the condition where identical generating machines are employed and load balance is achieved. Under these conditions, the field exitation of each of the machines will be substantially the same and the midpoint 47 voltage in the control regulator will be the same as if the parallel terminals were not interconnected between the two regulators. That is to say, neither regulator is affecting what would be the natural midpoint voltage of the control voltage divider standing alone.

In the balanced load condition, the midpoint voltage 47 is determined by the relative voltage drop across resistors 45 and 46. Due to the relatively low impedance of resistor 45, an insignificant voltage drop is present across resistor 45 and the midpoint 47 voltage impressed upon the emitter of a comparison transistor 48 is essentially the field voltage.

The control bias upon comparison transistor 48 is determined by a bias voltage divider across the field exitation formed by diode 49 and resistor 50. The forward voltage drop across diode 49 is small in the order of one-half a volt or less and generally but slightly less than the voltage required to turn on transistor 48. The differential between midpoint 47 and midpoint 51 of the respective dividers is thus chosen to hold transistor 48 at incipient conduction during normal balanced load conductions.

During normal operation of the regulator, the exitation of the field which appears on line 42 will be impressed across the voltage divider formed by resistors 45 and 46 as well as across the other voltage divider providing the bias to transistor 48 formed by diode 49 and resistor 50. The value of resistor 46 is chosen such that the voltage drop across resistor 45 through the complete range of field exitation closely approximates and compensates for the variation in voltage drop across the diode 49. In this manner, the differential voltage between the midpoints 47 and 51 of the respective voltage dividers remains essentially constant throughout the full operating range of exitation of the voltage regulator under balanced load conditions. Diode 49 is preferably a silicon diode which presents the same temperature and voltage characteristics as transistor 48 to further assure that the differential between the midpoint voltages of the two voltage dividers remains essentially constant during balanced load operation.

Assume now the condition wherein the regulator connected in parallel with the regulator shown in FIG. 2 has a lower field exitation or even a completely shorted field. As this occurs, the midpoint voltage 47 in the regulator in FIG. 2 will fall whereas the midpoint voltage 51 of the bias voltage divider will remain essentially the same. Accordingly, the bias upon transistor 48 is reduced or driven completely to a reverse bias condition further holding transistor 48 off. In this condition, the operation of the voltage regulation circuitry of the regulator shown in FIG. 2 is unaffected.

In converse and now assuming that the regulator in parallel with that shown in FIG. 2 experiences a higher field exitation, the reverse will occur. That is, the potential at midpoint 47 of the control voltage divider will increase the bias upon comparison transistor 48. Inasmuch as the transistor was biased to incipient turn on under normal balanced operating conditions, very little increase in field exitation of the parallel regulator is needed to drive transistor 48 into conduction. Accordingly, any increase in the potential at midpoint 47 above the potential at midpoint 51 of the bias voltage divider will be effective to turn the comparison transistor on in proportion to that voltage differential.

The emitter collector current for transistor 48 is drawn from the midpoint 47 of the control voltage divider and is passed through current limiting resistor 53 to the base of driver transistor 54. The collector of transistor 54 is connected through a load limiting resistor 56 to the midpoint 21 of the regulating voltage divider. The emitter of transistor 54 leads to ground.

As the differential in exitation between the two parallel regulators increases, transistor 54 is driven further into conduction with the consequent result that the midpoint 21 voltage of the regulating voltage divider is pulled toward ground. As this occurs, and as above described, the voltage regulating circuitry will increase the field exitation of its related current generator. As this occurs, the increased field exitation on the generator being regulated will appear on line 42 and be reflected back across the bias voltage divider to midpoint 51 to effect a feedback action which results in readjustment of the conduction of transistor 48 and consequently driver transistor 54 at a value that results in nearly equal field voltage being delivered by the two regulators to their respective alternator fields.

A large value capacitor 55 is placed across the base to emitter junction of driver transistor 54. This capacitor smooths out any ripples, spikes or other transients in the system and provides a general overall smooth adjustment of the regulating voltage. In a like manner, a capacitor 57 works in conjunction with load resistor 52 across the emitter base circuit of transistor 48 to provide high frequency filtering around the comparison transistor 48.

The value of resistor 56 in the collector circuit of driver transistor 54 is chosen such that when the transistor 54 is driven into full conduction, the voltage drop at midpoint 21 cannot exceed a predetermined maximum. In this manner, the maximum regulation or field output current which can be demanded upon the regulator is limited within acceptable values.

A filter capacitor 58 shown at the left hand side of the schematic in FIG. 2 is placed across the field exitation of the regulator. This capacitor serves to filter out transients and erratic voltage variations in the field winding circuit and generally smooths the overall performance of the regulator. In a like manner, a diode 59 is placed across the field circuit in the regulator of reverse polarity to bypass any reverse currents through the regulator.

From the above disclosure of the invention, it will be appreciated that the present invention provides a regulator which operates with solid state circuitry and provides a continuous modulation of the field current in the generating machine being regulated which provides for smooth regulation and operation. It will also be appreciated that, in accordance with the present invention, a regulator is provided which may be connected in parallel with other like regulators to effect field exitation balancing between parallel operating generating machines to achieve load balance.

The foregoing invention has been described in respect to a particular embodiment thereof shown in the drawing. However, no limitation as to the scope of the invention is thereby intended inasmuch as other variations and modifications of the invention will now become apparent to those skilled in the art.

I claim:

1. In a regulator for controlling the output of a current generating machine regulated by field winding exitation wherein the regulator includes sensing means responsive to the output of the machine to create a control voltage and regulator means coupled to the sensing means and responsive to the control voltage to vary the field exitation, the improvement permitting load balance regulation of two or more regulator-generating machine pairs connected in parallel comprising:
   control means in circuit with the field windings of each current generating machine and interconnecting the sensing means of each regulator and responsive to the highest field exitation of a given regulator to vary the control voltage of the other regulator in a direction to increase field exitation in that regulator.

2. The regulator of claim 1 wherein the control means includes a first leg of a control voltage divider in each regulator;
   first circuit means interconnecting the first legs of each control voltage divider of each regulator to form a midpoint thereof; and
   second circuit means in each regulator interconnecting the midpoint of the control voltage divider to the sensing means of that regulator for varying the control voltage whereby, increased output of a given generating machine and its consequent increased field exitation is applied to the regulators of the other machines to regulate the control voltage of their regulators to achieve load balance.

3. The regulator of claim 2 wherein the regulator means varies the field exitation inversely to the control voltage and wherein the second circuit means inversely varies the control voltage in response to the condition of the midpoint of the control voltage divider.

4. The regulator of claim 3 wherein the sensing means includes a regulating voltage divider having a midpoint at which the control voltage is created and wherein the second circuit means includes at least one transistor whose bias is controlled by the voltage at the midpoint of the control voltage divider and whose output is derived from the midpoint of the regulating voltage divider.

5. The regulator of claim 2 wherein the second circuit means includes a controlled semiconductor device biased to incipient conduction throughout the range of normal operating field exitation.

6. The regulator of claim 5 wherein the current path of the controlled semiconductor device is connected to the midpoint of the control voltage divider, the first leg of the control voltage divider in each regulator is of relatively low impedance and is also connected across the field exitation of its regulator by a third leg of relatively high impedance and further including a bias voltage divider across the field exitation and connected at its midpoint to provide the bias for the controlled semiconductor device and including impedance means therein for maintaining the midpoint of the second voltage divider at a potential which closely follows the midpoint of the control voltage divider to maintain the controlled semiconductor device at incipient conduction throughout the range of field exitation variation whereby a small increase in field exitation in one regulator is effective through the first circuit means to drive the controlled semiconductor device in the other regulator into conduction.

7. The regulator of claim 6 wherein the sensing means includes a regulating voltage divider having a midpoint at which the control voltage is created and further including a second controlled semiconductor device biased by the first controlled semiconductor device and having its current conducting path in circuit with the midpoint of the regulating voltage divider to vary the control voltage and consequent field exitation in response to the bias upon the first controlled semiconductor device.

8. The regulator of claim 7 further including impedance means in the current path of the second controlled semiconductor device to limit the maximum control voltage variation by the second controlled semiconductor device.

9. A regulator for balancing the output of two or more parallel connected current generating machines of the type employing field exitation windings comprising:
 a regulating voltage divider network connected across the parallel output of the current generating machines;
 a controlled semiconductor device in circuit with the regulating voltage divider and providing an output inversely proportional to the voltage of the voltage divider;
 a second controlled semiconductor device having its current path in circuit with the field windings of the current generating machine and biased by the first controlled semiconductor device to provide continuous modulation of the field winding current in response to the output of the current generating machine; and
 means in circuit with the regulating voltage divider and field windings of the respective machines and responsive to an input of greater field exitation from other machines to vary the voltage of the regulating voltage divider in a direction to increase field exitation.

10. In a regulator for controlling the output of a current generating machine regulated by field winding exitation including sensing means responsive to the output of the machine to create a control voltage and regulator means coupled to the sensing means and responsive to the control voltage to vary the field exitation, the improvement permitting load balance regulation of two or more regulator-generating machine pairs connected in parallel comprising:
 means in circuit with the sensing means and adapted for an input from the field windings of the machines to be regulated and responsive to an input of greater field exitation from other machines to vary the control voltage in a direction to increase field exitation in the regulated machine.

* * * * *